Patented Mar. 30, 1937

2,075,109

UNITED STATES PATENT OFFICE 2,075,109

PREPARATION OF ACYLATED POLY-ALKYLENE POLYAMINES

Hermann Friedrich, Leverkusen-I. G. Werk, Germany, assignor to I. G. Farbenindustrie Aktiengesellschaft, Frankfort-on-the-Main, Germany No Drawing. Application April 5, 1935, Serial No. 14,957. In Germany April 7, 1934

11 Claims. (Cl. 260—124)

The present invention relates to a new process of preparing acylated polyalkylene polyamines.

By the U. S. Patent 1,947,951 there have become known new condensation products from higher aliphatic acids and polyalkylene polyamines. They have hitherto been prepared by causing a higher aliphatic acid or an ester thereof to react upon a polyalkylene polyamine. It has now been found that an improved method for preparing such acylated polyalkylene polyamines consists in causing a polyalkylene polyamine to react with such amides of higher capillary active carboxylic acids as split off a volatile base during the said reaction. Thereby the formation of the said acylated polyalkylene polyamines can be achieved at lower temperatures and/or in shorter time than it was possible according to the process of the U. S. Patent 1,947,951. It is a further advantage of the present process that as by-products volatile bases, i. e. ammonia and volatile amines, are obtained which can be removed from the reaction mixture more easily than water or glycerol which are usually formed by condensing fatty acids or glycerides thereof with polyalkylene polyamines according to the known process. By passing a dry current of air free from carbon dioxide through the mixture during the reaction the ammonia or the volatile amine can be removed still more easily therefrom.

As polyalkylene polyamines there may be used for the purpose of the present invention for instance the reaction products of ammonia with alkylene polyhalogenides like ethylene dichloride, ethylene dibromide, propylene dichloride, butylene dichloride and other similar halogenides. The polyalkylene polyamines thus obtained usually consist of several components of different molecular weight, for example of dialkylene triamines, trialkylene tetramines and so on. For the present invention either the crude mixture of these products or the individual bases themselves may be used as starting material.

The acid amides which are suitable for the purpose of the present invention include the simple amides of higher capillary active carboxylic acids, for example such as the saturated and unsaturated fatty acids containing more than 6 carbon atoms like undecylic acid, undecylenic acid, lauric acid, palmitic acid, stearic acid, oleic acid, ricinoleic acid or mixtures of such acids, naphthenic acids, resin acids and so on. The acid amides may also be substituted in the amino group, if only the corresponding amines split off during the reaction are still volatile; for instance methyl amides may be employed. A preferred way of carrying out the present process is by heating the mixture of the starting materials for several hours to temperatures above 100° C.; heating is continued under reduced pressure until a test portion taken from the reaction mixture is soluble in diluted aqueous hydrochloric acid. The quantities of the reaction components may be varied within wide limits; preferably, however, at least 2 molecular quantities of the polyamine are used on 1 molecular quantity of the amide.

The products obtained in this manner mainly consist of monoacylated polyalkylene polyamines and closely resemble to the corresponding products obtained by the process of U. S. Patent 1,947,951.

The following examples illustrate the invention without limiting it thereto, the parts being by weight:

Example 1

283 parts of stearic acid amide are heated with 438 parts of triethylene tetramine for 10 hours to about 130° C. until a test portion is soluble in diluted hydrochloric acid; at the end of the reaction the pressure is preferably lowered to about 15 mm. Hg. Thereby 380 parts of a product probably corresponding to the formula $C_{17}H_{35}CO-NH-C_2H_4NH-C_2H_4NH-C_2H_4NH_2$ (monostearyl triethylene tetramine) are obtained.

Example 2

281 parts of oleic acid amide yield with 584 parts of triethylene tetramine, when heated for 10 hours to about 130° C., 400 parts of a product which is soluble in diluted hydrochloric acid and probably corresponds to the monooleyl triethylene tetramine.

Example 3

283 parts of stearic acid amide are heated in the same way as described in Examples 1 and 2 with 400 parts of a mixture of polyalkylene polyamines obtainable by heating ethylene dichloride with ammonia under pressure and removing any ethylene diamine formed during the latter reaction. After distilling the excess of bases under reduced pressure, 430 parts of a paste are obtained which is soluble in diluted acids.

Example 4

300 parts of ricinoleic acid amide yield with 400 parts of a mixture of bases according to Example 3, when heated to about 8 hours to 150–160° C., 450 parts of a mixture of acylated bases which is easily soluble in diluted acetic or hydrochloric acid.

Example 5

From 300 parts of ricinoleic acid amide and 400 parts of a mixture of polyalkylene polyamines according to Examples 3 and 4, by heating for several hours to 150° C., simultaneously passing a current of dry air free from $CO_2$ and finally removing the excess of bases partly by distilling under reduced pressure and partly by washing with water, there are obtained 430 parts of a mixture of polyalkylene polyamines which is acylated by the radical of ricinoleic acid. The mixture is easily soluble in diluted aqueous acids.

I claim:

1. The process which comprises causing a polyalkylene polyamine to react with an amide of a monocarboxylic acid containing more than 6 carbon atoms directly connected with each other in aliphatic linkage, which amide splits off a volatile base during the reaction.

2. The process which comprises causing a polyalkylene polyamine to react on an unsubstituted amide of a monocarboxylic acid containing more than 6 carbon atom directly connected with each other in aliphatic linkage.

3. The process which comprises causing a polyalkylene polyamine to react on an unsubstituted amide of a monocarboxylic acid containing more than 6 carbon atoms directly connected with each other in aliphatic linkage, until a test portion of the reaction product is completely soluble in diluted aqueous hydrochloric acid.

4. The process which comprises causing a polyalkylene polyamine to react on an unsubstituted amide of a higher fatty acid containing more than 6 carbon atoms, until a test portion of the reaction product is completely soluble in diluted aqueous hydrochloric acid.

5. The process which comprises causing a mixture of polyalkylene polyamines to react on an unsubstituted amide of a monocarboxylic acid containing more than 6 carbon atoms directly connected with each other in aliphatic linkage until a test portion of the reaction product is completely soluble in diluted aqueous hydrochloric acid.

6. The process which comprises causing a mixture of polyalkylene polyamines obtained by reacting an alkylene polyhalogenide with ammonia, to react on an unsubstituted amide of a fatty acid containing more than 6 carbon atoms, until a test portion of the reaction product is completely soluble in diluted aqueous hydrochloric acid.

7. The process which comprises causing a mixture of polyalkylene polyamines, obtained by reacting an alkylene dichloride with ammonia, to react on an unsubstituted amide of a fatty acid containing more than 6 carbon atoms, until a test portion of the reaction product is completely soluble in diluted aqueous hydrochloric acid.

8. The process which comprises causing a mixture of polyethylene polyamines, obtained by reacting an ethylene dichloride with ammonia, to react on an unsubstituted amide of a fatty acid containing more than 6 carbon atoms, until a test portion of the reaction product is completely soluble in diluted aqueous hydrochloric acid.

9. The process which comprises causing a mixture of polyethylene polyamines, obtained by reacting an ethylene dichloride with ammonia, to react on ricinoleic acid amide, until a test portion of the reaction product is completely soluble in diluted aqueous hydrochloric acid.

10. The process which comprises causing a mixture of polyethylene polyamines, obtained by reacting an ethylene dichloride with ammonia, to react on stearic acid amide, until a test portion of the reaction product is completely soluble in diluted aqueous hydrochloric acid.

11. The process which comprises causing triethylene tetramine to react on oleic acid amide, until a test portion of the reaction product is completely soluble in diluted aqueous hydrochloric acid.

HERMANN FRIEDRICH.